US012536636B2

(12) United States Patent
Das et al.

(10) Patent No.: US 12,536,636 B2
(45) Date of Patent: Jan. 27, 2026

(54) METHOD AND SYSTEM FOR EVALUATING QUALITY OF A DOCUMENT

(71) Applicant: L&T TECHNOLOGY SERVICES LIMITED, Chennai (IN)

(72) Inventors: Tarun Kumar Das, Digboi (IN); Triptesh Mallick, Bankura (IN); Madhusudan Singh, Bangalore (IN); Pragyesh Kumar, Agra (IN); Mridul Balaraman, Bangalore (IN)

(73) Assignee: L&T TECHNOLOGY SERVICES LIMITED, Chennai (IN)

(*) Notice: Subject to any disclaimer, the term of this patent is extended or adjusted under 35 U.S.C. 154(b) by 352 days.

(21) Appl. No.: 18/120,363

(22) Filed: Mar. 11, 2023

(65) Prior Publication Data

US 2024/0177285 A1  May 30, 2024

(30) Foreign Application Priority Data

Nov. 28, 2022 (IN) .............................. 202241068377

(51) Int. Cl.
*G06K 9/00* (2022.01)
*G06T 7/00* (2017.01)
(Continued)

(52) U.S. Cl.
CPC .............. *G06T 7/0002* (2013.01); *G06T 7/11* (2017.01); *G06V 10/762* (2022.01);
(Continued)

(58) Field of Classification Search
CPC ................. G06T 7/0002; G06T 7/11; G06T 2207/20081; G06T 2207/30168;
(Continued)

(56) References Cited

U.S. PATENT DOCUMENTS

2016/0188993 A1* 6/2016 Beato .................... G06F 18/24
382/163
2017/0286803 A1* 10/2017 Singh .................. G06F 18/2178
(Continued)

FOREIGN PATENT DOCUMENTS

CN        104915945 A    *  9/2015
JP        H08186712 A    *  7/1996

OTHER PUBLICATIONS

Towards Document Image Quality Assessment: A Text Line Based Framework and A Synthetic Text Line Image Dataset, Hongyu Li et al., ICDAR, 2019, pp. 551-558 (Year: 2019).*
(Continued)

*Primary Examiner* — Jayesh A Patel
(74) *Attorney, Agent, or Firm* — Kendal M. Sheets

(57) ABSTRACT

A method and system of determining quality of a document image is disclosed that includes segmenting, by one or more processors, a document image into a plurality of regions each of which comprises text data. The plurality of regions is classified into one of a plurality of image quality classes based on a determination of a highest prediction value from one of a plurality of machine learning models. The plurality of machine learning models is trained corresponding to one of the plurality of image quality classes. A cumulative quality score for the image is computed based on a weighted average of a number of regions classified into each of the plurality of image quality classes. The quality of the image is determined based on the cumulative quality score.

14 Claims, 8 Drawing Sheets

(51) Int. Cl.
  *G06T 7/11* (2017.01)
  *G06V 10/762* (2022.01)
  *G06V 10/764* (2022.01)
  *G06V 30/19* (2022.01)
  *G06V 30/414* (2022.01)

(52) U.S. Cl.
  CPC ...... *G06V 10/764* (2022.01); *G06V 30/19093* (2022.01); *G06V 30/414* (2022.01); *G06T 2207/20081* (2013.01); *G06T 2207/30168* (2013.01); *G06T 2207/30176* (2013.01)

(58) Field of Classification Search
  CPC ........ G06T 2207/30176; G06V 30/414; G06V 30/2528; G06V 30/19173; G06V 10/82
  See application file for complete search history.

(56) References Cited

U.S. PATENT DOCUMENTS

| | | | | |
|---|---|---|---|---|
| 2017/0308790 | A1* | 10/2017 | Nogueira Dos Santos | G06N 3/0464 |
| 2021/0133439 | A1* | 5/2021 | Mehra | G06V 10/82 |
| 2021/0216763 | A1* | 7/2021 | Dang | G06Q 10/10 |
| 2021/0224695 | A1* | 7/2021 | Stefanov | G06V 30/40 |
| 2021/0319247 | A1* | 10/2021 | Collet | G06V 30/19173 |
| 2023/0132720 | A1* | 5/2023 | Khmaissia | G06N 3/088 382/181 |
| 2023/0137931 | A1* | 5/2023 | Song | G06N 3/08 382/159 |

OTHER PUBLICATIONS

Predictor of OCR accuracy using statistical techniques, Juan Manuel Gonzalez, UNLV, 1996, pp. iii to 70 (Year: 1996).*

Accounting for Variance in Machine Learning Benchmarks, Xavier Bouthillier et al., MLSYS, 2021, pp. 1-23 (Year: 2021).*

A methodology for the classification of quality of requirements using machine learning techniques, Eugenio Parra et al., Elsevier, 2015, pp. 180-195 (Year: 2015).*

A Deep Learning Approach to Document Image Quality Assessment, Le Kang wt al., IEEE, 2014, pp. 2570-2574 (Year: 2014).*

Le Kang, Peng Ye, Yi Li, David Doermann; A deep learning approach to document image quality assessment; IEEE; 2014; p. 2570 to 2574.

Uwe Springmann, Florian Fink, Klaus U. Schulz; Automatic quality evaluation and (semi-) automatic Improvement of OCR models for historical printings; Oct. 20, 2016.

Juan Manuel Gonzalez; Predictor of OCR accuracy using statistical techniques; Jan. 1, 1996; p. 1 to 82; University of Nevada, Las Vegas.

Luis R. Blando, Junichi Kanai, Thomas A. Nartker; Prediction of OCR Accuracy Using Simple Image Features; Information Science Research Institute University of Nevada, Las Vegas USA; Aug. 1995.

* cited by examiner

300A

Initial Dataset

Open　Invoice
INSURANCE　Cover　USD
67170021'　　　Date
　　　PRIVATE
Date　　Packing
31/10/2020　Code

FIG. 3A

| Image 302 | OCR 1 304 | OCR 2 306 | String Matching (Levenstein) 308 | String Matching (sequential Matcher) 310 | String Matching (Jarowinkler) 312 | Average Value 314 | Maximum Value 316 | Minimum Value 318 | Data Labelling 320 |
|---|---|---|---|---|---|---|---|---|---|
| Invoice | _%ouvu.>i\|.rq. a\* 1.nvoi<2g | invoice | 0.2 | 0.3125 | 0.288571429 | 0.267023810 | 0.3125 | 0.2 | Bad |
| USD | USD | Sb | 0.333333333 | 0.4 | 0 | 0.244444444 | 0.4 | 0 | Bad |
| PRIVATE Code | p;1 | PRIVATE | 0.142857143 | 0.166666667 | 0.447619048 | 0.252380953 | 0.447619048 | 0.142857143 | Bad |
| 31/10/2020 | Ck8e | fade | 0.25 | 0.25 | 0.5 | 0.333333333 | 0.5 | 0.25 | Medium |
| Packing | 31/IG/202G | 32/10/2628 | 0.5 | 0.5 | 0.734285714 | 0.578095238 | 0.734285714 | 0.5 | Medium |
| Open | Packij)0 | facking | 0.5 | 0.533333333 | 0.69047619 | 0.574603174 | 0.690476190 | 0.5 | Medium |
| INSURANCE | Open | Open | 1 | 1 | 1 | 1 | 1 | 1 | Good |
| Date | INSURANCE | INSURANCE | 1 | 1 | 1 | 1 | 1 | 1 | Good |
| Date | Date-._ | | 0 | 0 | 0 | 0 | 0 | 0 | Bad |

FIG. 3B

METHOD AND SYSTEM FOR EVALUATING QUALITY OF A DOCUMENT

TECHNICAL FIELD

This disclosure relates generally to image processing, and more particularly to a system and a method for determining quality of a document.

BACKGROUND

There is a constant requirement for performing Optical Character Recognition (OCR) in order to extract the data from documents for various purposes. However, the correctness of data extracted from the documents using OCR techniques depends on the quality of the documents. OCR systems tend to extract erroneous data from poor quality documents which have poor resolution, noise, etc. Data extracted from such poor quality documents is not consistent and varies from one OCR algorithm to another. Therefore, OCR systems cannot determine the quality of a document which limits their capability and accuracy.

Therefore, there is a requirement to determine the quality of documents before performing OCR in order to extract correct data from documents irrespective of their quality.

SUMMARY OF THE INVENTION

In an embodiment, a method of determining quality of a document image is provided. The method may include segmenting an image into a plurality of regions comprising text data by a computing device. The plurality of regions may be classified into one of a plurality of image quality classes based on a determination of a highest prediction value from one of a plurality of machine learning models. The plurality of machine learning models may be trained corresponding to one of the plurality of image quality classes. A cumulative quality score for the image may be computed based on a weighted average of a number of regions classified into each of the plurality of image quality classes. The quality of the image may be determined based on the cumulative quality score.

In another embodiment, a system for determining quality of a document image comprising one or more processors and a memory is provided. The memory may store a plurality of processor-executable instructions which upon execution cause the one or more processors to segment the document image into a plurality of regions, wherein each of the plurality of regions may comprise text data. The each of the plurality of regions may be classified into one of a plurality of image quality classes. In an embodiment, each of the plurality of regions may be classified based on a determination of a highest prediction value from one of a plurality of machine learning models. In an embodiment, each of the plurality of machine learning models may be trained corresponding to one of the plurality of image quality classes. A cumulative quality score may be computed for the document image based on a weighted average of a number of regions classified into each of the plurality of image quality classes. The quality of the document image may be determined based on the cumulative quality score.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A depicts a dataset 300A comprising a plurality of regions comprising text data, in accordance with an embodiment of the present disclosure.

FIG. 3B is a table 300B depicting exemplary outputs received from the data segregation module of FIG. 2, in accordance with an exemplary embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims. Additional illustrative embodiments are listed.

The accuracy of text extraction depends on the quality of document image. Different optical character recognition (OCR) systems may give different results without providing any information about the accuracy of the extracted text. Therefore, determination of document quality before performing OCR would allow for an accurate extraction of textual data from a document.

Figure 1:
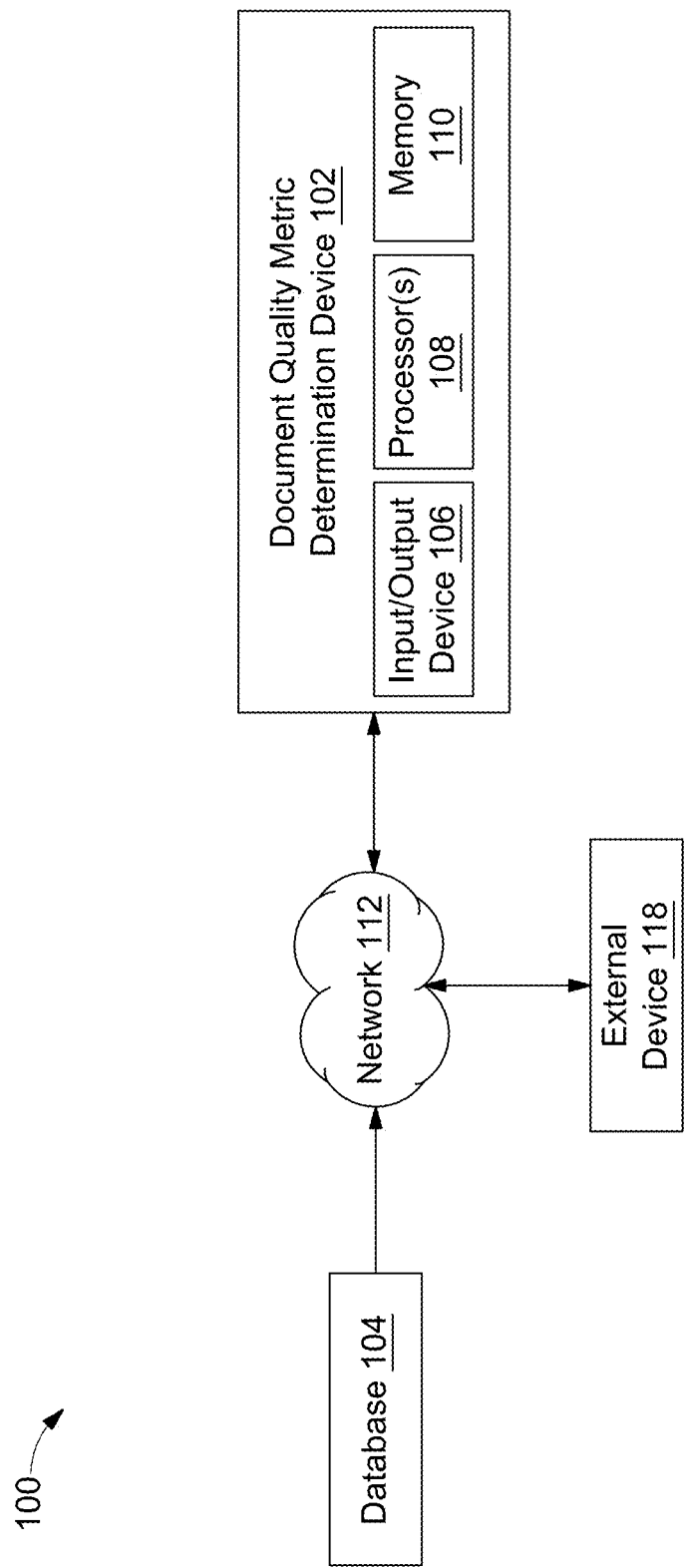
FIG. 1 is a block diagram of a document quality metric (DQM) determination system, in accordance with an embodiment of the present disclosure.

The present disclosure provides methods and systems for determining document quality metric of a document comprising one or more document images. FIG. 1 is a block diagram of a document quality metric (DQM) determination system 100 determining document quality metric of a document comprising one or more document images, in accordance with an embodiment of the present disclosure. The DQM determination system 100 may include a Document Quality Metric (DQM) determination device 102 comprising one or more processors 108, a memory 110 and an input/output device 106. The DQM determination device 102 may be communicably connected to a database 104 and an external device 118 through a network 112. In an embodiment, the database 104 may be enabled in a cloud or a physical database comprising training data such as document images of varying image quality classes such as bad, good and medium. In an embodiment, database 104 may be, but not limited to a third party paid or open-source databases.

In an embodiment, the DQM determination device 102 may be communicatively coupled to an external device 118 through a wireless or wired communication network 112. In an embodiment, the DQM determination device 102 may receive a request for text extraction from the external device 118 through the network 112. In an embodiment, external device 118 may be a variety of computing systems, including but not limited to, a smart phone, a laptop computer, a desktop computer, a notebook, a workstation, a portable computer, a personal digital assistant, a handheld or a mobile device. In an embodiment, the DQM determination device 102 may be in-built into the external device 118.

The DQM determination device 102 may include one or more processor(s) 108 and a memory 110. In an embodiment, examples of processor(s) 108 may include, but are not limited to, an Intel® Itanium® or Itanium 2 processor(s), or AMD® Opteron® or Athlon MP® processor(s), Motorola® lines of processors, FortiSOC™ system on a chip processors or other future processors. The memory 110 may store instructions that, when executed by the processor 108, cause the processor 108 to determine quality of document images, as discussed in greater detail below. The memory 110 may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

In an embodiment, the communication network 112 may be a wired or a wireless network or a combination thereof. The network 112 can be implemented as one of the different types of networks, such as but not limited to, ethernet IP network, intranet, local area network (LAN), wide area network (WAN), the internet, Wi-Fi, LTE network, CDMA network, and the like. Further, the network 112 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 112 can include a variety of network devices, including routers, bridges, servers, computing devices, storage devices, and the like.

Figure 2:
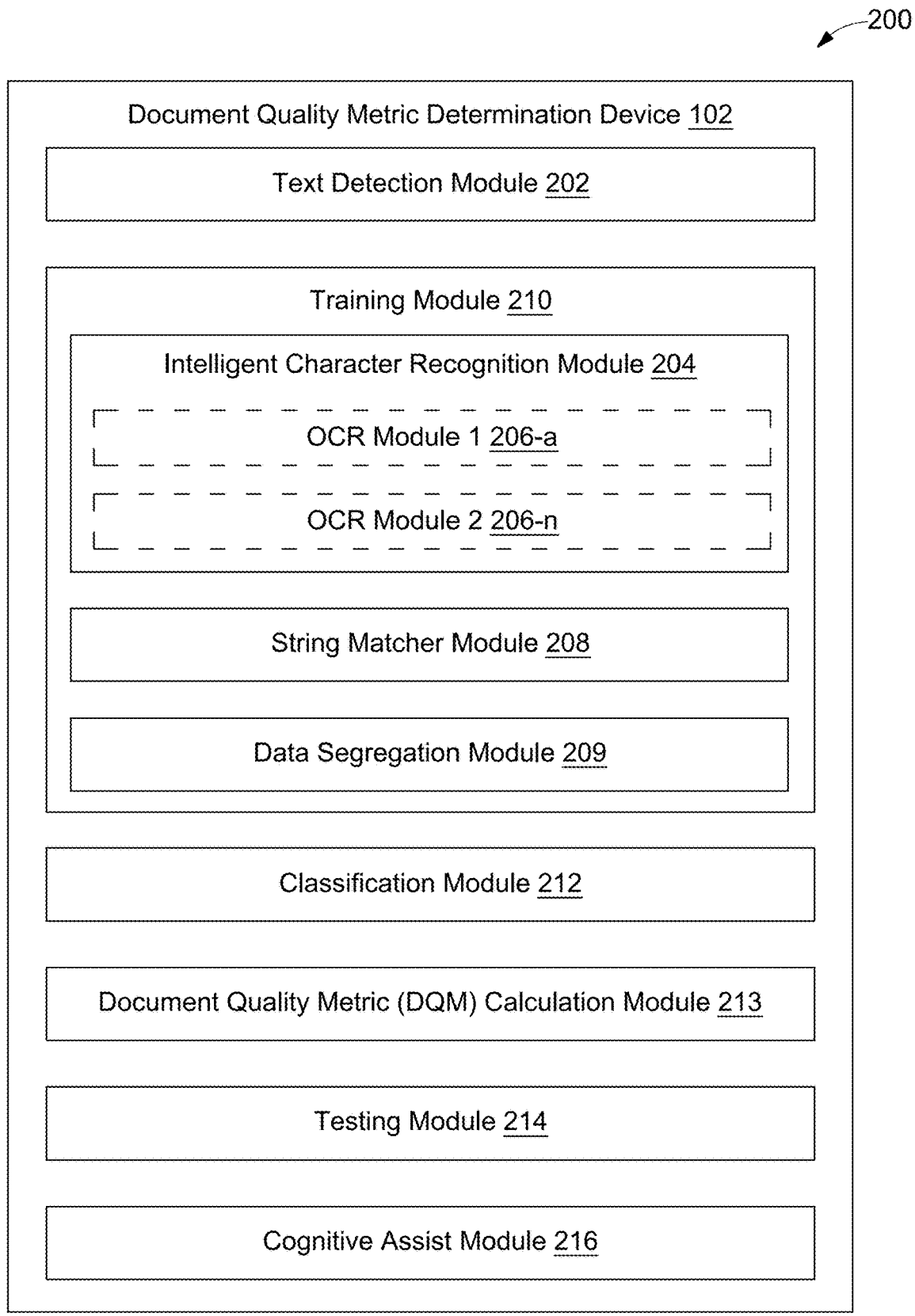
FIG. 2 illustrates a functional block diagram of the DQM determination device 102, in accordance with an embodiment of the present disclosure.

FIG. 2 illustrates a functional block diagram of the DQM determination device 102, in accordance with an embodiment of the present disclosure. Referring now to FIG. 2, a functional block diagram 200 of the DQM determination device 102 comprises a text detection module 202, an intelligent character recognition (ICR) module 204, a string matcher module 208, a data segregation module 209, a training module 210, a classification module 212, a Document Quality Metric (DQM) calculation module 213, a testing module 214 and a cognitive assist module 216.

The text detection module 202 may segment an inputted document image into a plurality of regions comprising text data. The text detection module 202 may utilize an open-source Image Processing and Deep Learning based text detection methods for determining regions comprising text in the document image. FIG. 3A depicts a dataset 300A comprising a plurality of regions comprising text data, in accordance with an embodiment of the present disclosure.

The training module 210 may include the ICR module 204, the string matcher module 208 and the data segregation module 209. In an embodiment, the ICR module 204 may comprise of multiple Optical Character Recognition (OCR) modules 206*a-n*. In an embodiment, the text data in the plurality of text regions detected and segmented by the text detection module 202 may be extracted using multiple OCR modules 206*a-n*. In an embodiment, each of the multiple OCR modules 206*a-n* may comprise of a unique OCR algorithm for extracting text data from each of the plurality of regions. The string matcher module 208 may comprise of a plurality of Natural Language Processing (NLP) based text matching modules each of which may provide text matching scores depicting a match level between the text data extracted for each region using each of the OCR modules 206*a-n*.

In an embodiment, training module 210 may be configured to train three different models for determining the quality metric of an input document image as described in detail below. In an embodiment, the data segregation module 209 may segregate the dataset 300A into three training datasets comprising a good training dataset, medium training dataset and a bad training dataset each for detection of a quality metric of an input image as good, medium and bad respectively.

FIG. 3B is a table 300B depicting exemplary outputs received from the data segregation module 209 of FIG. 2, in accordance with an exemplary embodiment of the present disclosure.

In an embodiment, the data segregation module 209 may be configured to generate three training datasets in order to train the three different models which helps in determining the quality metric of an input document image as good, medium and bad. In an embodiment, dataset 300A may comprise of plurality of regions 302 determined by segmenting a document image by the text detection module 202. The regions 302 may be processed by each of the OCR modules 206*a-n* of the ICR module 204 to provide an output of text data. Column 304 and 306 depicts the text extracted using the two exemplary OCR modules 206*a* and 206*b*.

In an embodiment, the column 308, 310 and 312 depicts matching scores based on matching level between the text data extracted by each of the two exemplary OCR modules 206*a* and 206*b*. In an embodiment, the matching scores may be determined by the String Matcher module 208 comprising a plurality of unique NLP based text matching modules. In an embodiment, text matching score of 1 may depict an exact match between the text data extracted from a region using the two exemplary OCR modules 206*a* and 206*b* and a text matching score of 0 may indicate an absolute mismatch between the text data extracted for a region using the two exemplary OCR modules 206*a* and 206*b*. The training module 210 may determine an average value 314 of the text matching scores outputted by each of the NLP based text matching modules of the string matcher module 208. In an embodiment, the maximum text matching score 316 and a minimum text matching score 318 of each region may be determined between the text matching scores outputted by the each of the NLP based string matcher modules 208.

Figure 4:
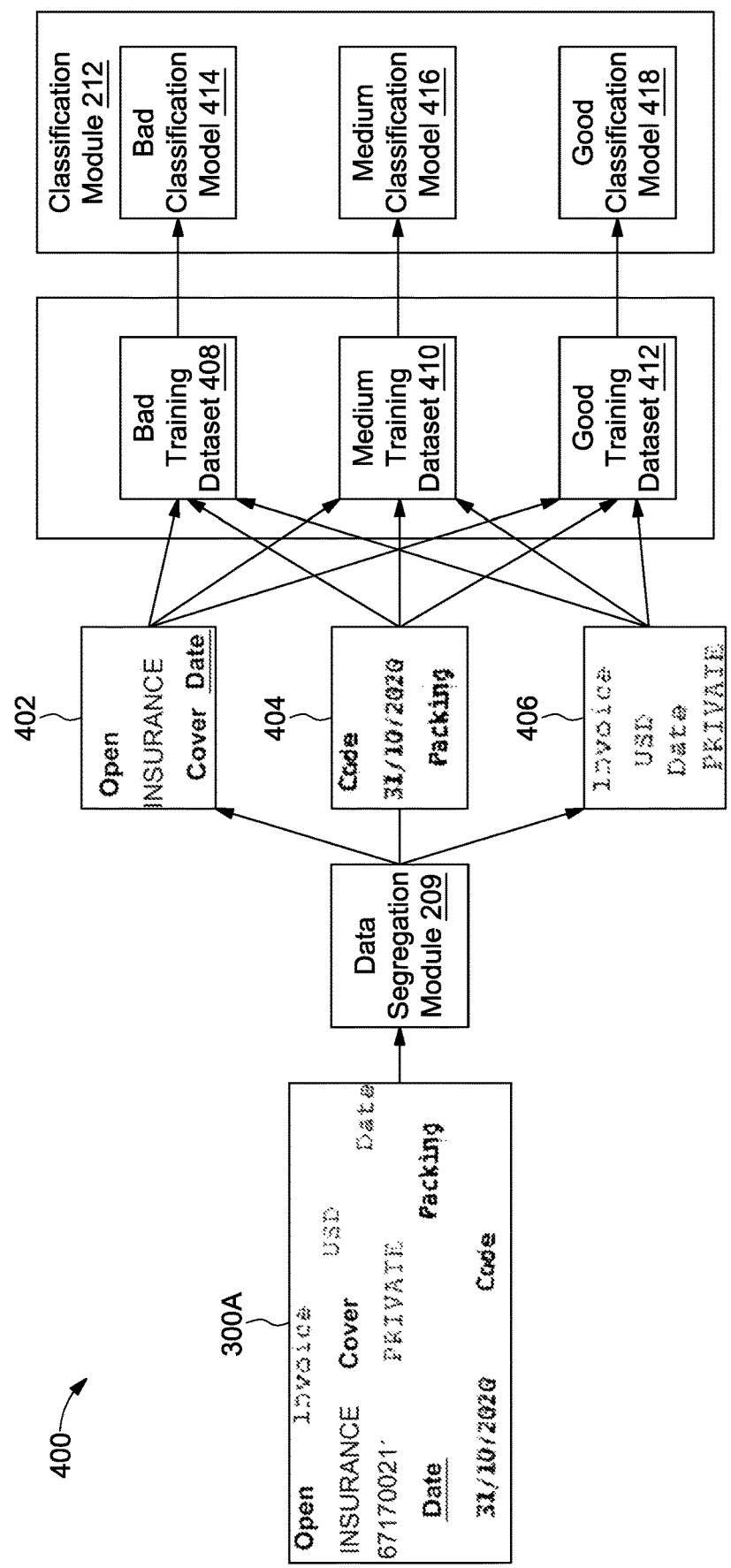
FIG. 4 is a data segregation flow diagram, in accordance with an embodiment of the present disclosure.

FIG. 4 depicts a data segregation flow diagram, in accordance with an embodiment of the present disclosure. In an embodiment, the dataset 300A may be segregated into bad dataset 402, medium dataset 404 and good dataset 406 by the segregation module 209. In an embodiment, the data segregation module 209 may utilize an upper threshold level and a lower threshold level to segregate or cluster the regions in the bad dataset 402, the medium dataset 404 and the good dataset 406. In an embodiment, the upper threshold level and the lower threshold level may be established using a statistical methodology known in the art. In an embodiment, the statistical methodology may include, but not limited to, ground truth analysis or ROC curve analysis.

The training module 210 may utilize the good dataset 402, the medium dataset 404 and the bad dataset 406 to generate bad training dataset 408, medium training dataset 410 and good training dataset 412. Accordingly, the bad training dataset 408, the medium training dataset 410 and the good training dataset 412 may be utilized to train the corresponding bad classification model 414, medium classification model 416 and good classification model 418 of the classification module 212.

In an embodiment, the training module 210 may create the bad training dataset 408 by including 50% of data from the bad dataset 406 and 25% data each from the medium dataset 404 and good dataset 402. Similarly, medium training dataset 410 may be generated by including 50% of data from the medium dataset 404 and 25% data each from the good dataset 402 and bad dataset 406. The good training dataset 412 may be created by including 50% of data from the good dataset 402 and 25% data each from the medium dataset 404 and bad dataset 406. In an embodiment, the data labelling 320 provided in table 300B by the data segregation module 209 may be used by the training module 210 in order to create the bad training dataset 408, medium training dataset 410 and good training dataset 412.

Accordingly, the training module 210 may train a machine learning model for detecting images as bad image quality class based on the bad training dataset 408 created. Accordingly, the bad classification model 414 may be trained to provide a probability score for an input region to belong to the bad image quality class. In an embodiment, the training module 210 may train a machine learning model for detecting images as medium image quality class based on the balanced medium training dataset 410. Accordingly, the medium classification model 416 may be trained to provide a probability score for an input region to belong to the medium image quality class. In an embodiment, the training module 210 may train a machine learning model for good classification model 418 configured to provide a probability score for an input region to belong to the good image quality class based on the good training dataset 412.

Figure 5A:
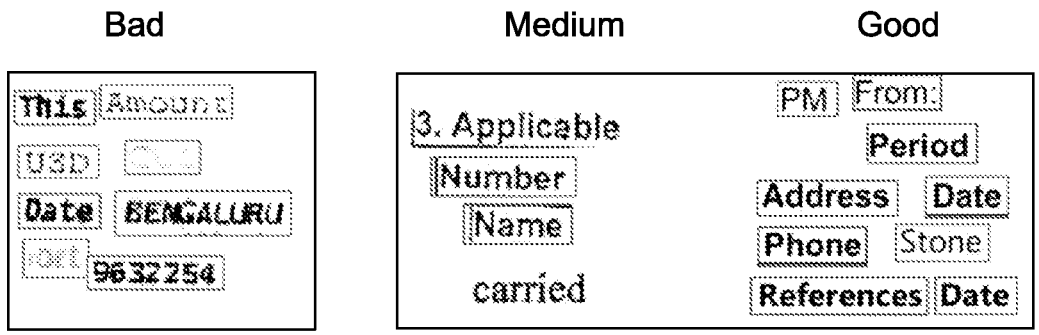
FIGS. 5A, 5B and 5C depicts an exemplary bad training dataset, medium training dataset and good training dataset generated from the input dataset, in accordance with an embodiment of the present disclosure.
Figure 5B:
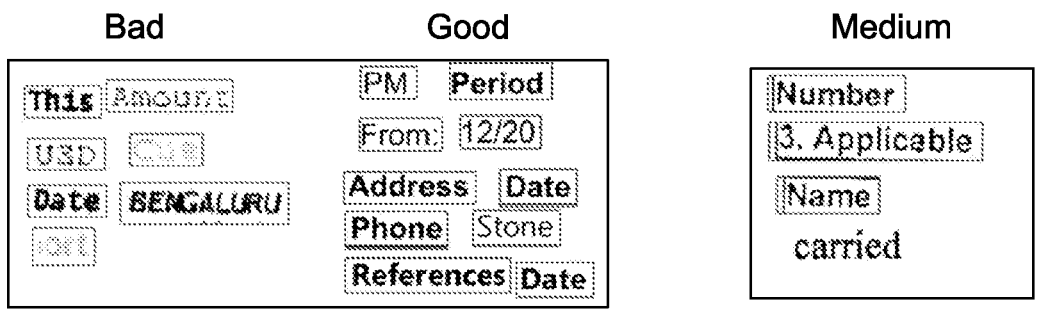
Figure 5C:
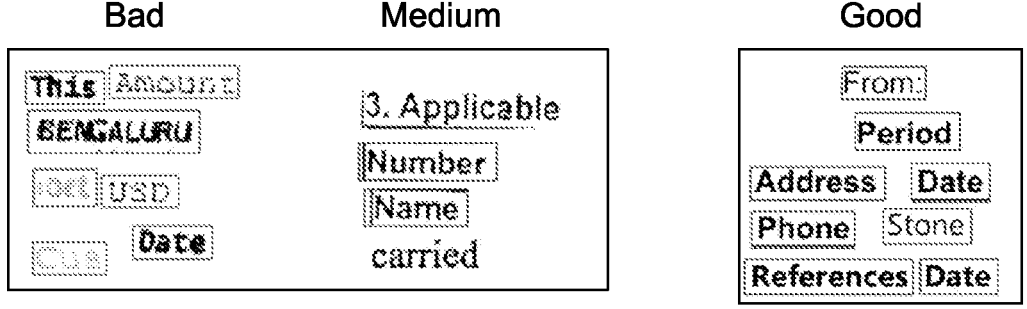

FIGS. 5A, 5B and 5C depicts an exemplary bad training dataset 408, medium training dataset 410 and good training dataset 412 generated from the input dataset 300A, in accordance with an embodiment of the present disclosure.

In an embodiment, each of the bad classification model 414, medium classification model 416 and good classification model 418 trained by the training module 210 may be validated for their accuracy. In an embodiment, the validation may be performed based on, but not limited to, a train test split validation process by splitting the training datasets 408-412 used to train the corresponding models 414-418 into a training data and a validating data. In an embodiment, each of the bad training dataset 408, the medium training dataset 410 and the good training dataset 412 may be split into training data and a validating data in a 80:20 ratio. In an embodiment, the each of the bad training dataset 408, the medium training dataset 410 and the good training dataset 412 may be separated into "features" and "target". In an embodiment, each of the bad training dataset 408, the medium training dataset 410 and the good training dataset 412 may be validated based on a curve analysis.

The classification module 212 may utilize the bad classification model 414, medium classification model 416 and good classification model 418 to classify input text regions into classes predefined by a user. In an embodiment, the image quality classes may be pre-defined as bad, medium and good. In an embodiment, each of the bad classification model 414, medium classification model 416 and good classification model 418 may utilize machine learning models such as, but not limited to, Convolution Neural Network (CNNs), etc. In an embodiment, each of the bad classification model 414, medium classification model 416 and good classification model 418 may output a confidence score for each of the regions. The confidence score may be a float value in a range of 0 to 1.

In an embodiment, the classification module 212 may classify each of the regions detected in an input image into one of the pre-defined image quality classes based on highest probability score output by either of the bad classification model 414, medium classification model 416 and good classification model 418. Accordingly, the classification module 212 may utilize a highest confidence score outputted from the bad classification model 414, medium classification model 416 and good classification model 418, to label or classify the regions based on the pre-defined quality classes.

In an embodiment, the DQM calculation module 213 may pre-defined word level weights for each quality class. The pre-defined word level weights may be used by the DQM calculation module as word-level DQM to determine data quality metric of a sentence, paragraph, page and/or document. In an embodiment, based on the pre-defined word-level weights for each quality class The DQM calculation module 213 may determine a cumulative quality score for a sentence, paragraph, a document page, or a document comprising multiple pages based on weighted average of the regions or words classified as bad, medium and good by the classification module 212. In an embodiment, the DQM or quality score may be determined using following formula:

$$\text{Quality Score}_{(sentence, paragraph, page, document)} = \frac{(w_1 * B + w_2 * M + w_3 * G)}{(B + M + G)},$$

wherein B, M and G may represent the number of regions predicted as bad, medium and good in sentence, paragraph, page and/or document level and $w_1$, $w_2$ and $w_3$ may represent pre-defined word-level weights/DQM for classes bad, medium and good respectively. In an embodiment, the pre-defined word-level weights/DQM for classes bad, medium and good may be determined based on concept of center of gravity or may be predefined as 0, 0.5 and 1 respectively.

In an exemplary embodiment, in case there are 10 regions detected by the text detection module 202 and 5 regions have been classified as good, 3 as medium and 2 as bad by the classification module 212. Accordingly, based on the pre-defined word-level weights are $w_1$=0, $w_2$=0.5 and $w_3$=1, the quality score for the 10 regions may be determined by the DQM calculation module 213 as: (2*0+3*0.5+5*1)/(10), based on above-mentioned methodology.

Accordingly, the DQM for 10 regions may be determined to be equal to 0.65 by the DQM calculation module 213. In an embodiment, pre-defined sentence-level weights, paragraph-level weights, page-level weights and document-level weights may be used for determining the quality score (also referred interchangeably as DQM) for a paragraph, page and document.

In an embodiment, a testing module 214 may test the three models i.e. the bad classification model 414, the medium classification model 416 and the good classification model 418 as trained by the training module 210 for their validity in real time operation. In an embodiment, the three models may be tested based on a variance in the probability score outputted by each of the models for a region. In case, the variance in the probability score is low the models 414-418 of the classification module 212 may be retrained by the training module 210 using the new input data and segregating the regions of the new input data to create the training datasets 408-412 again.

In an embodiment, in case the variance in the probability score is low the models may be retrained using state of the art cognitive assist module 216 as described in the Indian patent application number 201841050033, incorporated herein in its entirety by reference. In an embodiment, the cognitive assist module 216 may be utilized to train the models of the classification module 212 corresponding to new data or to retrain the models in order to increase the variance in the prediction values outputted by the models.

Figure 6:
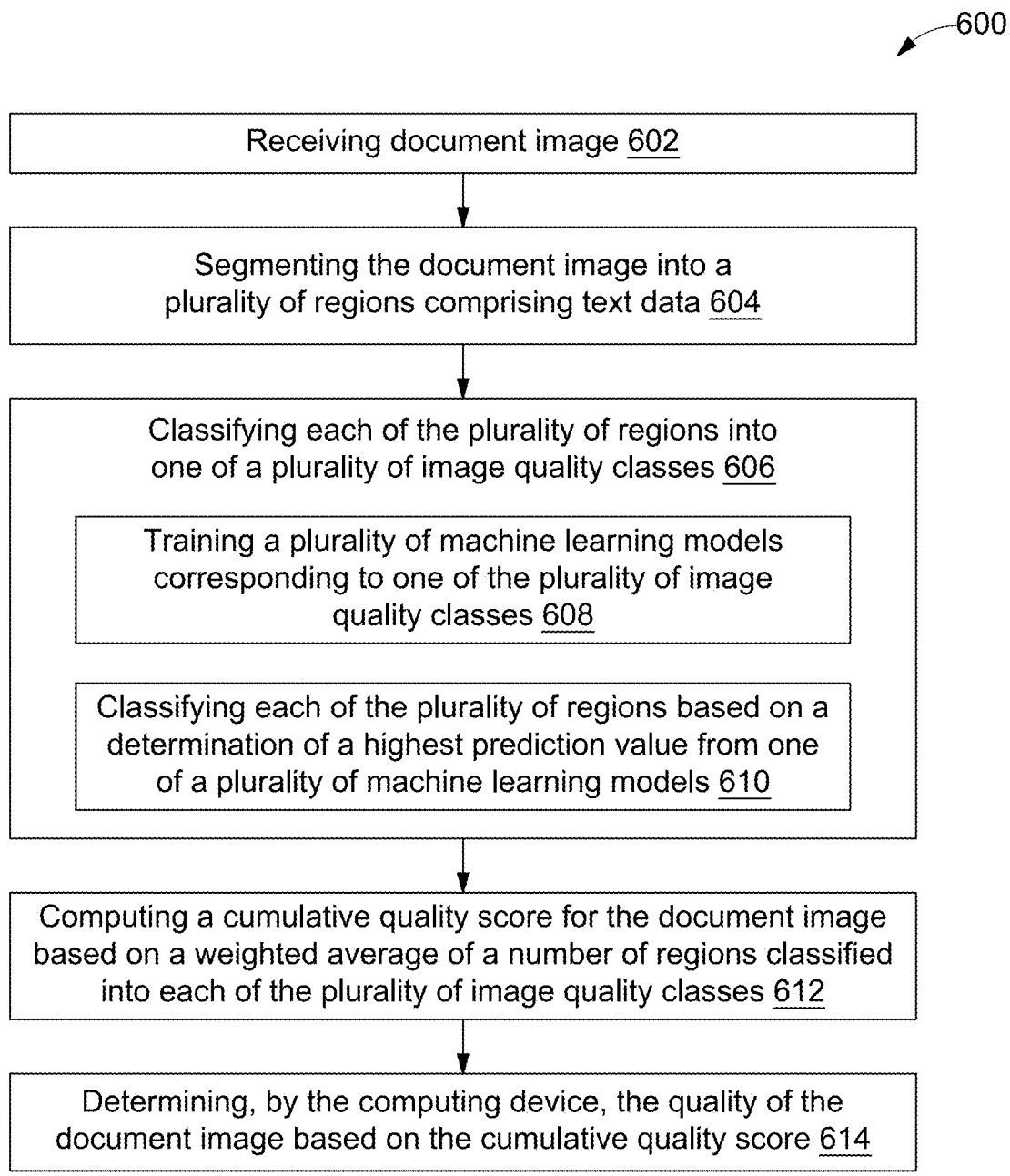
FIG. 6 is a flowchart depicting methodology of determining quality of a document image, in accordance with an embodiment of the present disclosure.

FIG. 6 is a flowchart depicting methodology of determining quality of a document image, in accordance with an embodiment of the present disclosure.

At step 602, an input document image may be received by the DQM determination device 102. At step 604, the received document image may be segmented into a plurality of regions. In an embodiment, the plurality of regions may be detected in the document image using a text detection method known in the art. At step 606, each of the plurality of regions may be classified into one of a plurality of image quality classes. In an embodiment, the plurality of image quality classes may be, but not limited to, good, medium and bad. In an embodiment, the plurality of image quality classes may be pre-defined. At step 608, a plurality of machine learning models may be trained corresponding to each of the plurality of image quality classes. At step 610, each of the plurality of regions may be classified based on determination of a highest confidence score from the plurality of machine learning models for each of the regions. At step 612, a cumulative quality score for the document image based on a weighted average of a number of regions classified into each of the plurality of image quality classes. At step 614, the quality of the document image may be determined based on the cumulative quality score.

Figure 7:
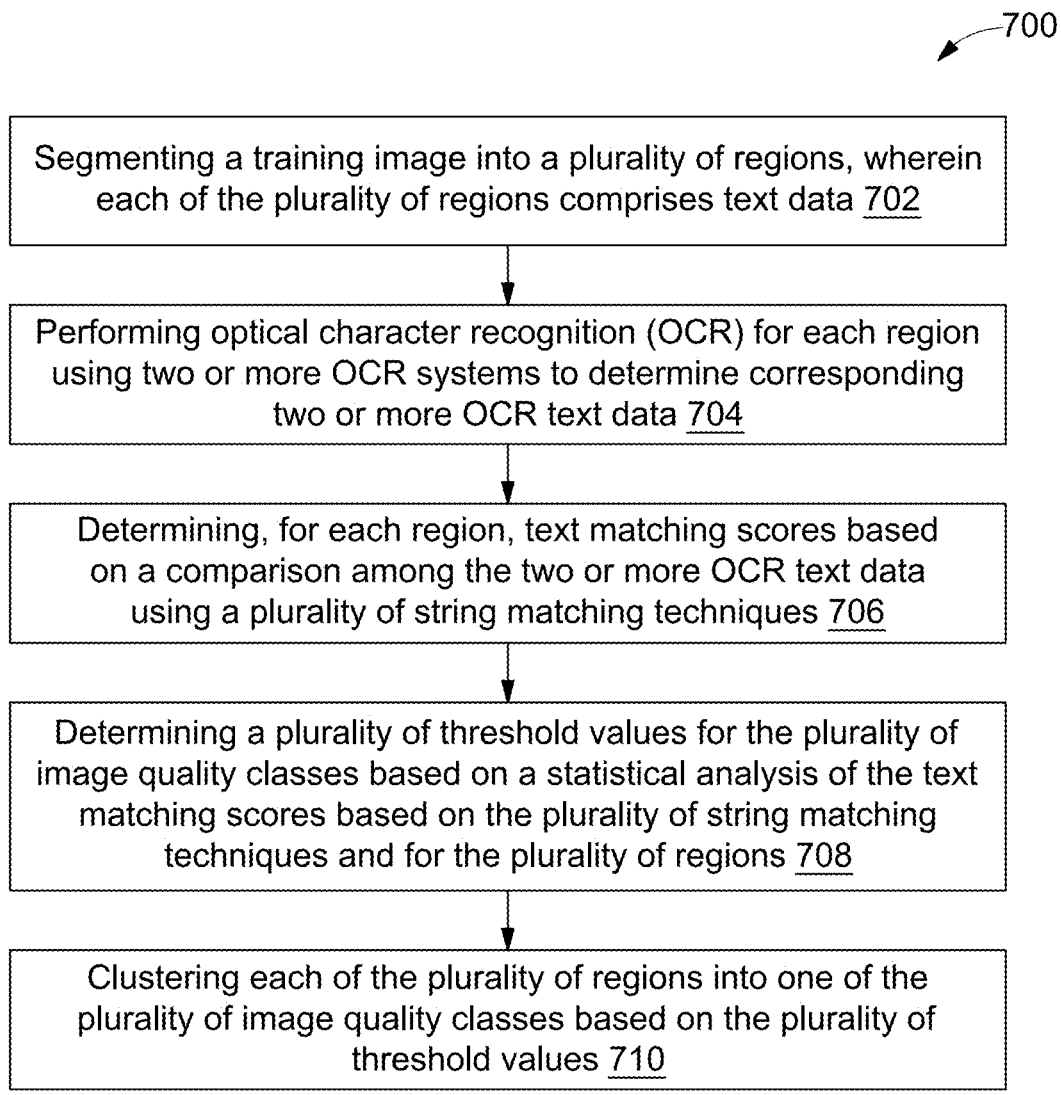
FIG. 7 is a flowchart of a method of determining training datasets, in accordance with an embodiment of the present disclosure.

FIG. 7 is a flowchart of a method of determining training datasets, in accordance with an embodiment of the present disclosure. At step 702, a training image may be segmented into a plurality of regions comprising text data. At step 704, OCR may be performed for each of the plurality of regions using two or more OCR systems to determine the corresponding two or more OCR text data. At step 706, text matching score may be determined based on a comparison of among the two or more OCR text data determined for each regions using string matching techniques. In an embodiment, string matching techniques may include using NLP based text matching methods which may determine a level of match between the texts. At step 708, a plurality of threshold values may be determined based on a statistical analysis of the text matching scores based on the plurality of string matching techniques and for the plurality of regions. At step 710, each of the plurality of regions may be clustered into one of the plurality of image quality classes based on the plurality of threshold values. In an embodiment, the clusters created for each of the plurality of image quality classes may be used to create training datasets for training the machine learning models 414-418 as discussed in detail in FIG. 4 for each of the plurality of image quality classes.

It is intended that the disclosure and examples be considered as exemplary only, with a true scope of disclosed embodiments being indicated by the following claims.

What is claimed is:

1. A method of determining quality of a document image, the method comprising:
   segmenting, by a computing device, the document image into a plurality of regions, wherein each of the plurality of regions comprises text data;
   classifying, by the computing device, each of the plurality of regions into one of a plurality of image quality classes,
      wherein each of the plurality of regions is classified based on a determination of a highest prediction value from one of a plurality of machine learning models, and
      wherein each of the plurality of machine learning models is trained corresponding to one of the plurality of image quality classes;
      wherein the training of each of the plurality of machine learning models corresponding to one of the plurality of image quality classes comprises determining a training dataset for each of the plurality of image quality classes;
      wherein the determination of the training dataset for each of the plurality of image quality classes comprises:
   segmenting, by a computing device, a training image into a plurality of regions, wherein each of the plurality of regions comprises text data;
   for each of the plurality of regions,
      performing, by the computing device, optical character recognition (OCR) using two or more OCR systems to determine corresponding two or more OCR text data;
      determining, by the computing device, text matching scores based on a comparison among the two or more OCR text data using a plurality of string matching techniques;
      determining, by the computing device, a plurality of threshold values for the plurality of image quality classes based on a statistical analysis of the text matching scores based on the plurality of string matching techniques and for the plurality of regions;
   clustering, by the computing device, the plurality of regions into one of the plurality of image quality classes based on the plurality of threshold values;
   computing, by the computing device, a cumulative quality score for the document image based on a weighted average of a number of regions classified into each of the plurality of image quality classes; and
   determining, by the computing device, the quality of the document image based on the cumulative quality score.

2. The method of claim 1, wherein the determination of the plurality of threshold values comprises:
   computing, for each of the plurality of regions, a minimum text matching score, a maximum text matching score, and an average text matching score based on the text matching scores for the plurality of string matching techniques; and determining the plurality of threshold values based on a statistical calculation of the minimum, the maximum, and the average text matching scores for the plurality of regions.

3. The method of claim 1, wherein
the plurality of threshold values comprises a lower threshold value and an upper threshold value, and
wherein the plurality of image quality classes comprises a bad image quality class for document images for the average text matching score less than or equal to the lower threshold value, a good image quality class for the average text matching score greater than or equal to the upper threshold value, and a medium image quality class for the average text matching score greater than the lower threshold value and less than the upper threshold value.

4. The method of claim 1, wherein the plurality of regions comprises at least one of a region with word level text data, a region with sentence level text data, a region with paragraph level text data, and a region with page level text data.

5. The method of claim 1, wherein the computing device is configured to determine quality of a document comprising a plurality of document images by:
computing a cumulative quality score for each of the plurality of document images based on the weighted average of the number of regions classified into each of the plurality of image quality classes; and
determining the quality of the document based on the cumulative quality score for each of the plurality of document images.

6. The method of claim 1, wherein the computing device is configured to re-train the plurality of machine learning models based on a variance in a prediction value from each of the plurality of machine learning models.

7. A system for determining quality of a document image, comprising:
one or more processors;
a memory communicatively coupled to the one or more processors, wherein the memory stores a plurality of processor-executable instructions, which, upon execution, cause the one or more processors to:
segment the document image into a plurality of regions, wherein each of the plurality of regions comprises text data;
classify each of the plurality of regions into one of a plurality of image quality classes,
wherein each of the plurality of regions is classified based on a determination of a highest prediction value from one of a plurality of machine learning models, and
wherein each of the plurality of machine learning models is trained corresponding to one of the plurality of image quality classes;
wherein the training of each of the plurality of machine learning models corresponding to one of the plurality of image quality classes comprises determining a training dataset for each of the plurality of image quality classes;
wherein the one or more processors are further configured to determine the training dataset for each of the plurality of image quality classes by:
segmenting, by a computing device, a training image into a plurality of regions, wherein each of the plurality of regions comprises text data;
for each of the plurality of regions, performing optical character recognition (OCR) using two or more OCR systems to determine corresponding two or more OCR text data;
determining text matching scores based on a comparison among the two or more OCR text data using a plurality of string matching techniques;
determining a plurality of threshold values for the plurality of image quality classes based on a statistical analysis of the text matching scores for the plurality of string matching techniques and for the plurality of regions;
clustering the plurality of regions into one of the plurality of image quality classes based on the plurality of threshold values;
compute a cumulative quality score for the document image based on a weighted average of a number of regions classified into each of the plurality of image quality classes; and
determine the quality of the document image based on the cumulative quality score.

8. The system of claim 7, wherein the determination of the plurality of threshold values comprises:
computing, for each of the plurality of regions, a minimum text matching score, a maximum text matching score, and an average text matching score based on the text matching scores for the plurality of string matching techniques; and
determining the plurality of threshold values based on a statistical calculation of the minimum, the maximum, and the average text matching scores for the plurality of regions.

9. The system of claim 7, wherein
the plurality of threshold values comprises a lower threshold value and an upper threshold value, and
wherein the plurality of image quality classes comprises a bad image quality class for document images for the average text matching score less than or equal to the lower threshold value, a good image quality class for the average text matching score greater than or equal to the upper threshold value, and a medium image quality class for the average text matching score greater than the lower threshold value and less than the upper threshold value.

10. The system of claim 7, the plurality of regions comprises at least one of a region with word level text data, a region with sentence level text data, a region with paragraph level text data, and a region with page level text data.

11. The system of claim 7, wherein the one or more processors are further configured to determine quality of a document comprising a plurality of document images by:
computing a cumulative quality score for each of the plurality of document images based on the weighted average of the number of regions classified into each of the plurality of image quality classes; and
determining the quality of the document based on the cumulative quality score for each of the plurality of document images.

12. A non-transitory computer-readable medium storing computer-executable instructions for determining quality of a document image, the computer-executable instructions, executed by one or more processors, configured for:
segmenting the document image into a plurality of regions, wherein each of the plurality of regions comprises text data;
classifying each of the plurality of regions into one of a plurality of image quality classes,
wherein each of the plurality of regions is classified based on a determination of a highest prediction value from one of a plurality of machine learning models, and wherein each of the plurality of machine learning models is trained corresponding to one of the plurality of image quality classes;

wherein to train each of the plurality of machine learning models corresponding to one of the plurality of image quality classes, the computer-executable instructions are configured for determining a training dataset for each of the plurality of image quality classes;

wherein to determine the training dataset for each of the plurality of image quality classes, the computer-executable instructions are configured for:

segmenting a training image into a plurality of regions, wherein each of the plurality of regions comprises text data;

for each of the plurality of regions, performing optical character recognition (OCR) using two or more OCR systems to determine corresponding two or more OCR text data;

determining text matching scores based on a comparison among the two or more OCR text data using a plurality of string matching techniques;

determining a plurality of threshold values for the plurality of image quality classes based on a statistical analysis of the text matching scores based on the plurality of string matching techniques and for the plurality of regions;

clustering the plurality of regions into one of the plurality of image quality classes based on the plurality of threshold values;

computing a cumulative quality score for the document image based on a weighted average of a number of regions classified into each of the plurality of image quality classes; and determining the quality of the document image based on the cumulative quality score.

13. The non-transitory computer-readable medium of claim 12, wherein to determine the plurality of threshold values, the computer-executable instructions are configured for:

computing, for each of the plurality of regions, a minimum text matching score, a maximum text matching score, and an average text matching score based on the text matching scores for the plurality of string matching techniques; and determining the plurality of threshold values based on a statistical calculation of the minimum, the maximum, and the average text matching scores for the plurality of regions.

14. The non-transitory computer-readable medium of claim 12, wherein the plurality of threshold values comprises a lower threshold value and an upper threshold value, and wherein the plurality of image quality classes comprises a bad image quality class for document images for the average text matching score less than or equal to the lower threshold value, a good image quality class for the average text matching score greater than or equal to the upper threshold value, and a medium image quality class for the average text matching score greater than the lower threshold value and less than the upper threshold value.

\* \* \* \* \*